US007330269B2

(12) United States Patent
Zurn et al.

(10) Patent No.: US 7,330,269 B2
(45) Date of Patent: Feb. 12, 2008

(54) SINGLE SENSOR RING LASER GYROSCOPE

(75) Inventors: Brittan L. Zurn, Roseville, MN (US); Richard G. Beaudet, Inver Grove Heights, MN (US); Thomas A. Savard, St. Paul, MN (US); Leroy O. Thielman, Shoreview, MN (US); Rodney H. Thorland, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 251 days.

(21) Appl. No.: 11/040,382

(22) Filed: Jan. 21, 2005

(65) Prior Publication Data

US 2006/0164650 A1 Jul. 27, 2006

(51) Int. Cl.
*G01C 19/64* (2006.01)

(52) U.S. Cl. ...................................... 356/459; 356/473

(58) Field of Classification Search ................ 356/459, 356/350, 460–476; 372/94
See application file for complete search history.

(56) References Cited

U.S. PATENT DOCUMENTS 4,152,072 A 5/1979 Hutchings
4,514,087 A 4/1985 Vescial
4,551,021 A * 11/1985 Callaghan et al. .......... 356/473
4,632,555 A * 12/1986 Malvern ..................... 356/472
4,899,346 A 2/1990 Perkins
4,945,313 A * 7/1990 Brilka et al. ................ 329/349
5,384,636 A * 1/1995 Martin et al. ............... 356/467
5,463,652 A 10/1995 Hall
5,663,792 A 9/1997 Killpatrick et al.
6,611,379 B2 8/2003 Qian et al.
6,618,151 B2 9/2003 Killpatrick et al.
6,658,039 B2 12/2003 Numai
2002/0089670 A1 7/2002 Mortenson

FOREIGN PATENT DOCUMENTS

EP 0 106 573 A2 4/1984
EP 0 201 853 A2 11/1986
EP 201853 A2 * 11/1986
EP 0 285 723 A2 10/1988

OTHER PUBLICATIONS

International Search Report dated May 12, 2006, Application No. PCT/US2005/046942, 12 pages.

* cited by examiner

*Primary Examiner*—Tarifur Chowdhury
*Assistant Examiner*—Jonathon D Cook

(57) ABSTRACT

A ring laser gyroscope is described which includes a laser cavity configured to provide an optical laser path for a pair of counter-propagating laser beams, an optical sensor configured to receive a portion of the energy from the counter-propagating laser beams, and a unit configured to receive outputs from the optical sensor. The unit is configured to utilize the output to generate at least a residual path length control signal, a laser intensity monitor signal, and readout signals.

19 Claims, 11 Drawing Sheets

SINGLE SENSOR RING LASER GYROSCOPE

BACKGROUND OF THE INVENTION

This invention relates generally to ring laser gyroscopes, and more specifically, to a ring laser gyroscope which utilizes a single optical sensor in the generation of output signals typically generated by ring laser gyroscopes which incorporate multiple optical sensors.

A ring laser gyroscope utilizes interference of laser light within a ring optical cavity to detect changes in orientation and rate of turn. At least some known ring laser gyroscopes utilize two optical sensors, which provide signals to respective electronic circuits to generate ring laser gyroscope output signals. One such optical sensor is sometimes referred to as a laser intensity monitor (LIM) sensor, and the other optical sensor is sometimes referred to as a readout sensor.

The LIM sensor and associated electronic circuitry generate at least a LIM monitor signal, a residual path length control (PLC) modulation signal, and a residual single beam signal (SBS) which are utilized in the operation of the ring laser gyroscope. The readout sensor and its associated circuitry generate readout signals, which, in one known ring laser gyroscope, are ninety degrees out of phase from one another, representing an optical fringe pattern having a frequency and phase. The readout signals are utilized in the determination of changes in an orientation and a rate of turn, for example, of a flight platform in which the ring laser gyroscope is installed. More specifically, as the fringe pattern moves across the readout sensor, the readout sensor and associated circuitry produce a series of pulses, the number of pulses created represents an angle or orientation of the flight platform, and a rate at which the pulses are created is representative of a speed of rotation (e.g., a rotation rate) of the flight platform in which the ring laser gyroscope is mounted.

Such ring laser gyroscopes operate in one of a number of transverse electromagnetic (TEM) wave modes. A TEM wave mode describes a plane light wave (e.g., a laser beam) propagating through free space which has a particular intensity pattern of radiation measured in a plane perpendicular (transverse) to the propagation direction of the beam. One such wave mode is a $TEM_{00}$ mode of oscillation. $TEM_{00}$ is a mode illustrative of a laser projected as a single beam, and is sometimes referred to as a fundamental transverse mode and corresponds to a smooth distribution of light across the output of the laser.

As further described below, other modes (TEMs) may be utilized in ring laser gyroscopes. For example, a mode of $TEM_{10}$ is best described as two bright spots oriented horizontally with a thin dark region between them (assuming the lasing plane is horizontal). Further, a mode of $TEM_{01}$ is similar to $TEM_{10}$ except that it is rotated by 90 degrees. Other TEMs (modes) are also possible, for example, a mode of $TEM_{23}$ is illustrative of a laser having a rectangular array of spots, three horizontally and four vertically.

Drawbacks to the known two sensor ring laser gyroscopes include performance degradation due to mode competition (near the $TEM_{00}$ mode), production cycle time, cost, sensor inventory due to a need to match a normal distribution of gyroscope fringe patterns to a corresponding grid pattern on the readout sensor, low readout signal (power), and gyroscope life due to the original signal strength degrading over time. Mode competition occurs when a higher-ordered transverse mode resonates with the operating mode. The frequency spacing between the two modes is a function of the cavity curvature, defined by the curvature of the mirrors that comprise the cavity. If the curvature changes, for example by stress induced by temperature changes, the frequency spacing can go to zero for certain transverse modes. This is particularly troublesome for transverse modes that are not discriminated against strongly by the internal body aperture.

BRIEF SUMMARY OF THE INVENTION

In one aspect, a ring laser gyroscope is provided which comprises a laser cavity configured to provide an optical laser path for a pair of counter-propagating laser beams, an optical sensor configured to receive a portion of the energy from the counter-propagating laser beams, and a unit configured to receive outputs signals from the optical sensor. The unit is configured to utilize the output signals to generate at least a residual path length control signal, a laser intensity monitor signal, and readout signals.

In another aspect, a method for fabricating a ring laser gyroscope which incorporates a single optical sensor is provided. The method comprises configuring the optical sensor to output two signals about ninety degrees out of phase from one another, and providing an amplification circuit to amplify the out of phase signals, the amplified signals to be representative of an orientation and rate of turn of the ring laser gyroscope. The method further comprises providing a squaring function configured to square each of the amplified signals, and providing a summing circuit configured to add together the squared signals, an output of the summing circuit representative of a laser intensity monitor signal.

In still another aspect, another method for fabricating a ring laser gyroscope which incorporates a single optical sensor is provided. The method comprises configuring the optical sensor to receive an optical fringe pattern and output two signals about ninety degrees out of phase from one another. The signals are representative of an angle and the frequency of the pulses are representative of a rate of turn sensed by the ring laser gyroscope. The method further comprises providing an amplification circuit to amplify the two signals, and providing a low pass filter configured to filter one of the amplified signals, an output of the filter representative of a laser intensity monitor signal.

In yet another aspect, a ring laser gyroscope is provided that comprises an optical sensor configured to receive a portion of the energy from a pair of counter-propagating laser beams in a fringe pattern. The optical sensor comprises dual photo diodes configured to output signals that are out of phase from one another by about one-half period and an amplification circuit configured to amplify and output the signals, where the signals are representative of an orientation and the frequency of the signals is representative of a rate of turn sensed by the ring laser gyroscope. The ring laser gyroscope also comprises a squaring circuit configured to square the outputs of the amplification circuit, and a summing circuit configured to add together outputs of the squaring circuit, where an output of the summing circuit is configured to be representative of a laser intensity monitor signal.

In yet another aspect, a ring laser gyroscope is provided that comprises an optical sensor configured to receive a portion of the energy from a pair of counter-propagating laser beams in a fringe pattern. The optical sensor comprises dual photo diodes configured to output signals that are out of phase from one another by about one-half period and an amplification circuit configured to amplify and output the signals, where the signals are representative of an orientation and the frequency of the signals is representative of a rate of turn sensed by the ring laser gyroscope. The ring laser gyroscope also comprises a low pass filter configured to receive an output of the amplification circuit, and an output of the low pass filter is configured to be representative of a laser intensity monitor signal.

BRIEF DESCRIPTION OF THE DRAWINGS

FIG. 16 illustrates an integrated outline of a $TEM_{10}$ mode aperture for utilization with the photodiodes of a single sensor.

DETAILED DESCRIPTION OF THE INVENTION

Figure 1:
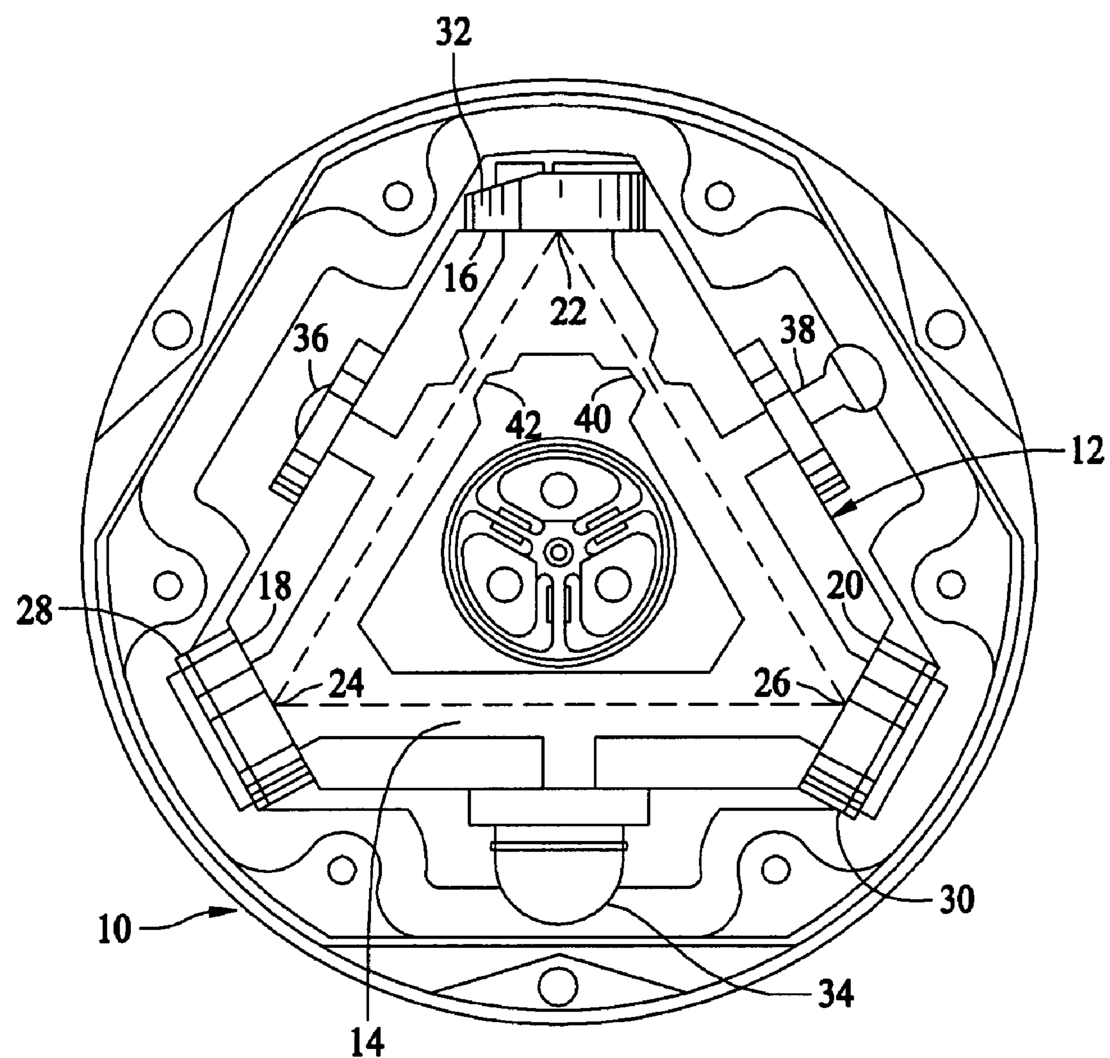
FIG. 1 is a diagram illustrating optical components and an optical path for transmitted beams within a ring laser gyroscope.

FIG. 1 is a diagram illustrating optical components and an optical path for transmitted beams within a known ring laser gyroscope 10. Ring laser gyroscope 10 includes a substantially triangular laser block 12 that provides a ring laser cavity 14 containing lasing gas. Laser block 12 includes block surfaces 16, 18, and 20 between which is an optical laser path with vertices 22, 24, and 26 at respective block surfaces 16, 18, and 20. Mirror assemblies 28, 30, and 32 are mounted to block surfaces 16, 18, and 20, respectively. Ring laser cavity 14 is filled with a lasing gas that is ignited or excited by a sufficient voltage between cathode 34 and each of anodes 36 and 38. In turn, a pair of counter-propagating laser beams travel along the optical laser path within laser cavity 14. One or more of mirror assemblies 28, 30, and 32 are transmissive, which allows a portion of the counter-propagating laser beams to pass through the mirror and onto sensors as further described below.

In use, the two laser beams are generated and propagated in opposite directions around the closed loop path of laser cavity 14 about the axis of rotation of ring laser gyroscope 10. Rotation of ring laser gyroscope 10 causes the effective path length for the two beams to change, thus producing a frequency difference between the two beams since the frequency of oscillation of the laser beams is dependent upon the length of the optical laser path. The frequency difference between the beams causes a phase shift between the beams that changes at a rate proportional to the frequency difference. The interaction of the beams produces an interference fringe pattern which is observed to move with a velocity proportional to the rate of angular rotation of ring laser gyroscope 10 about the axis of rotation.

In the closed loop path of laser cavity 14, gas discharge currents flow in opposite directions, from anode 36 to cathode 34 and from anode 38 to cathode 34. These gas discharge currents generate the oppositely traveling laser beams that travel within laser block 12, passing through apertures 40 and 42. Apertures 40 and 42 are centered in the laser propagation path of laser cavity 14, and are sufficiently narrow to reduce the effects from other modes of laser propagation, while not substantially affecting results of the $TEM_{00}$ mode of laser propagation.

Figure 2:
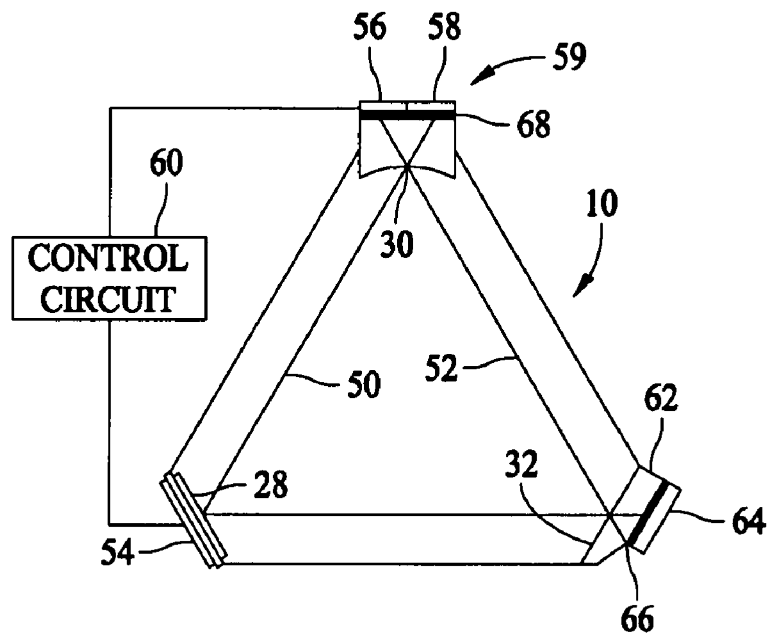
FIG. 2 is a diagram depicting laser beams propagating to and from optical components within a ring laser gyroscope.

FIG. 2 is a schematic diagram depicting laser beams 50 and 52 propagating within ring laser gyroscope 10 (shown in FIG. 1). As described above, laser beams 50 and 52 are established to counter propagate in the gyroscope 10 around a close loop path by reflection from mirrors 28, 30, and 32. Mirror 28 along with a path length control driver 54 act together to change a length of laser cavity 14 (shown in FIG. 1) of ring laser gyroscope 10. Mirror 30 is a curved, partly reflective (e.g., partially transmissive), mirror which has a pair of detectors 56 and 58 mounted thereon to receive a portion of the counter propagating beams 50 and 52 to determine their intensity. The signals detected by detectors 56 and 58 are added to remove a single beam signal which acts as a noise source to a path length control circuit 60. Detectors 56 and 58 are sometimes referred to collectively as a laser intensity monitor (LIM) sensor 59 which is used in conjunction with path length control circuit 60. Path length control circuit 60 is electrically connected between LIM sensor 59 and path length control driver 54 to control the path length in the laser.

Mirror 32 is also partially transmissive and attached to a prism 62 so that the portion of counter propagating beams 50 and 52 that pass through mirror 32 are also reflected within prism 62 and subsequently directed to a readout sensor 64. A readout sensor window 66 is located on readout sensor 64 and is positioned adjacent prism 62. Likewise, a LIM sensor window 68 is located on detectors 56 and 58 and is positioned adjacent curved mirror 30.

Ring laser gyroscope 10 and similar ring laser gyroscopes have been intentionally constrained to operate in the fundamental $TEM_{00}$ mode. The constraint is imposed either by use of a mask having a single aperture, for each of counter propagating beams 52 and 52, therethrough placed on the surface of LIM sensor 59, for example, formed on sensor window 68 utilizing a masking process, or through the use of intercavity apertures (e.g., apertures 40 and 42 shown in FIG. 1). As a result, only a single spot of each laser beam is able to reach the respective detector. When LIM sensor 59 indicates that a maximum intensity is reached, the path length of counter-propagating beams 50 and 52 is known to be proper for operation in the $TEM_{00}$ mode.

Figure 3:
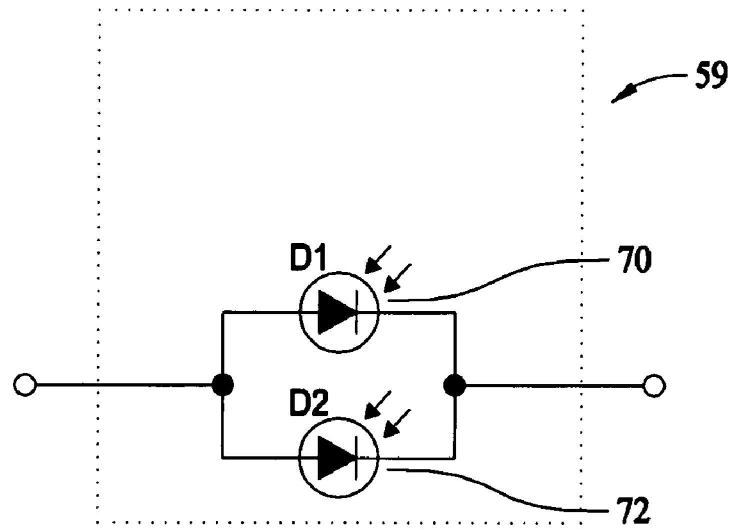
FIG. 3 is an illustration of one embodiment of a laser intensity monitor (LIM) sensor.

FIG. 3 illustrates one embodiment of LIM sensor 59 for ring laser gyroscope 10 (shown in FIG. 1). Specifically, detectors 56 and 58 of LIM sensor 59 are formed from parallel photo diodes 70 and 72 (one for each oppositely traveling beam). In one embodiment, residual path length control (PLC) modulation, a residual single beam signal (SBS), and a DC LIM monitor signal are obtained by processing of signals from LIM sensor 59 while operating in the $TEM_{00}$ laser mode and are collectively referred to as gyroscope control signals.

Figure 4:
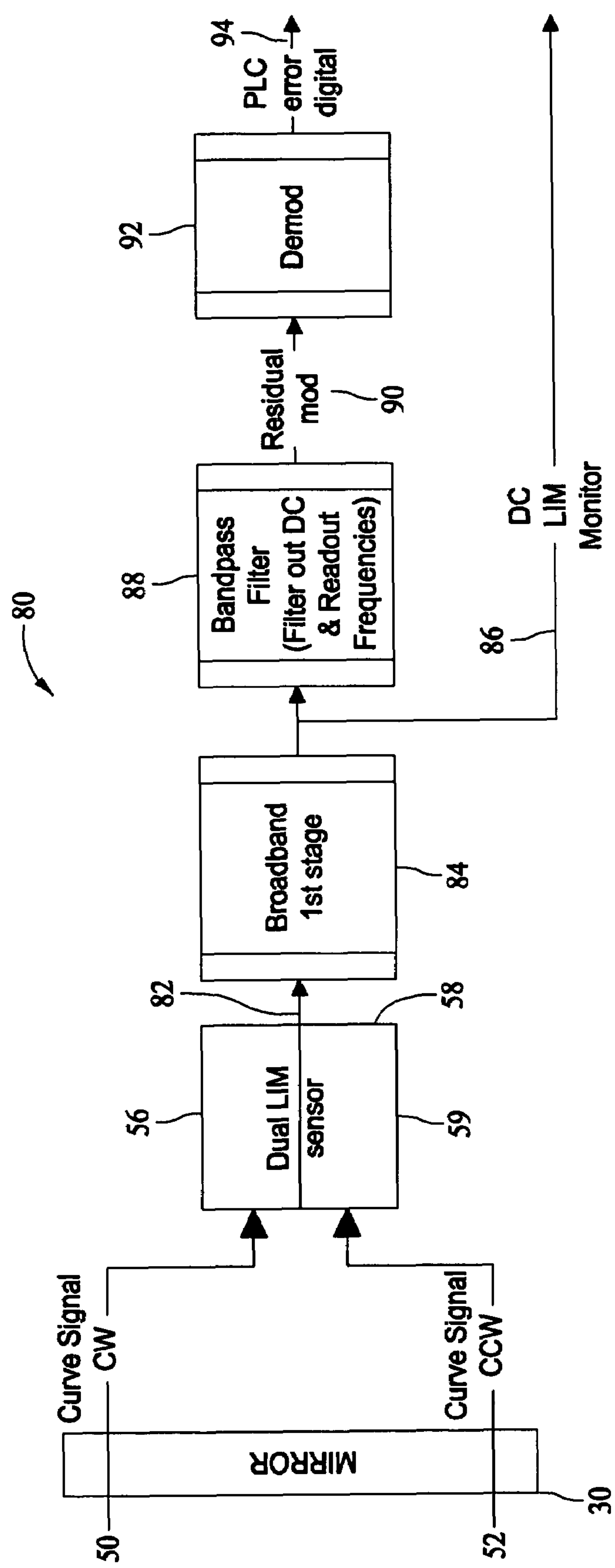
FIG. 4 is a signal processing diagram illustrating the processing of signals from the LIM sensor of FIG. 3.

FIG. 4 is a signal processing diagram 80 further illustrating processing of signals from LIM sensor 59. The portion of counter propagating beams 50 and 52 that pass through curved mirror 30 impinge LIM sensor 59, specifically detectors 56 and 58. Output signal 82 from LIM sensor 59 is then filtered by a first stage broadband filter 84, which provides DC LIM monitor signal 86. DC LIM monitor signal 86 is also applied to band pass filter 88, which filters out DC and residual SBS signals to provide a residual PLC modulation signal 90. Residual PLC modulation signal 90 is applied to a demodulator 92 which outputs a PLC error signal 94.

Figure 5:
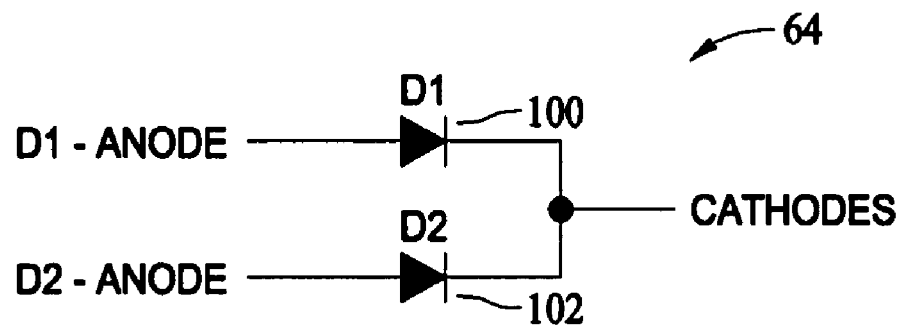
FIG. 5 is an illustration of one embodiment of a readout sensor.
Figure 6:
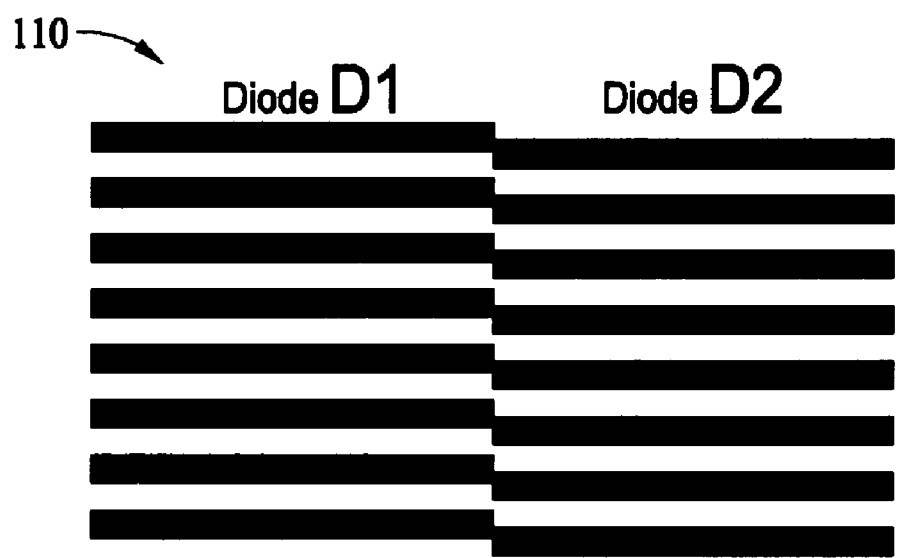
FIG. 6 is an illustration of a typical grid pattern for photo diodes illustrating a half period offset.

Referring to FIG. 5, one embodiment of readout sensor 64 is illustrated. Readout sensor 64 includes dual photo diodes 100 and 102, which in one embodiment are masked by gridlines offset by a half period. FIG. 6 is an illustration of a typical grid pattern 110 masked onto photo diodes 100 and 102, which illustrates the resulting half period offset between the individual photo diodes.

Figure 7:
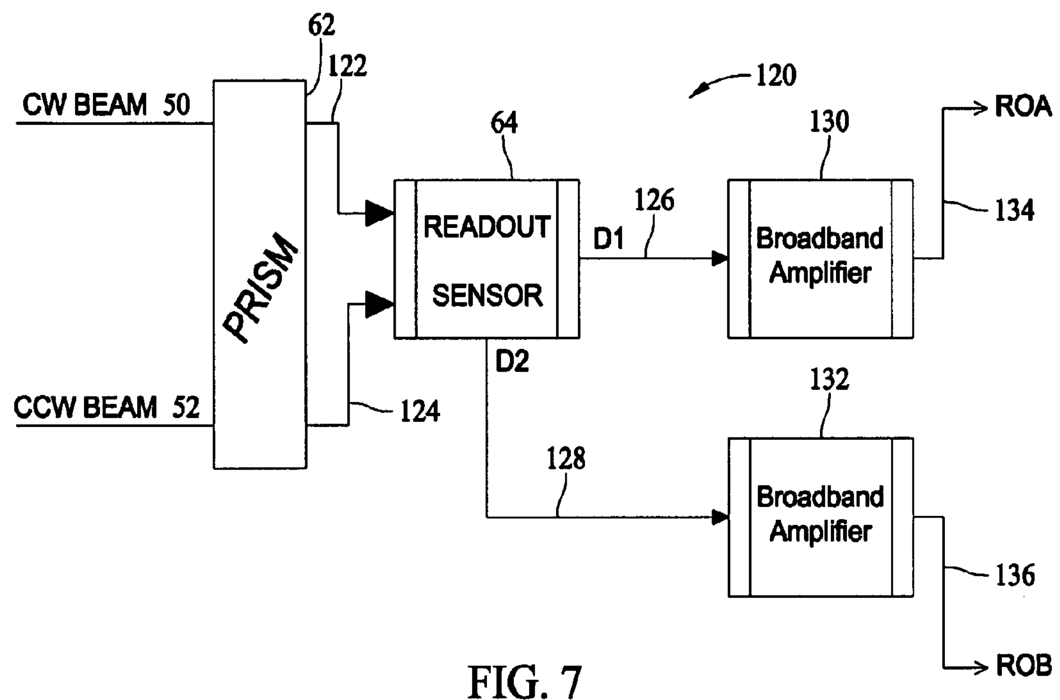
FIG. 7 is a signal processing diagram illustrating the processing of signals from the readout sensor of FIG. 5.

FIG. 7 is a signal processing diagram 120 further illustrating operation of readout sensor 64. The counter propagating beams 50 and 52 pass through prism 62 as interfering signals 122 and 124, resulting in a non-apertured fringe pattern propagating onto readout sensor 64, which includes photo diodes 100 and 102 which are offset by a half period. Readout sensor 64 outputs a signal 126 from photo diode 100 (D1) and a signal 128 from photo diode 102 (D2), ninety degrees out of phase from one another, which are input into broadband amplifiers 130 and 132 respectively. The outputs 134 and 136 of amplifiers 130 and 132 provide a fringe pattern having a frequency and a phase which is utilized to determine an orientation and gain of a platform in which the ring laser gyroscope is mounted.

Figure 8:
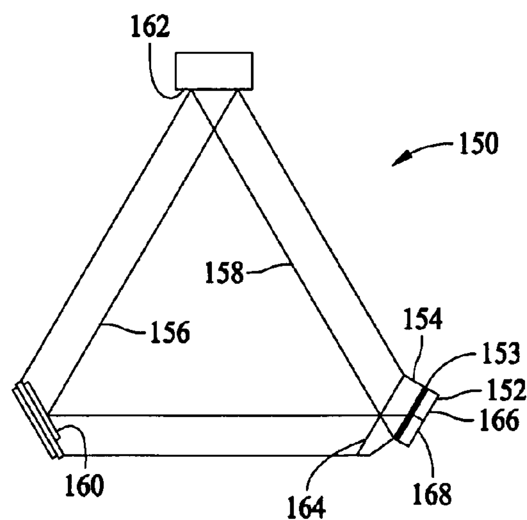
FIG. 8 is a diagram depicting laser beams propagating to and from optical components within a ring laser gyroscope that integrates the functions of a readout sensor and a LIM sensor utilizing a single sensor.

FIG. 8 is a schematic block diagram 150 for a ring laser gyroscope, which integrates the above described functions of readout sensor 64 and LIM sensor 59, into a single sensor 152 which includes a sensor window 153 thereon. In the embodiment, single sensor 152 receives a portion of the laser beams that propagate through prism 154 and sensor window 153. As further described below, apertures are formed for single sensor 152, for example, on sensor window 153, which are utilized to achieve laser mode (TEM mode) discrimination. While described above as an aperture on sensor window 153, the aperture also can be integrated into a sensor gridline pattern as further described below. FIG. 8 further depicts laser beams 156 and 158 counter-propagating within the ring laser gyroscope. Similar to laser beams 50 and 52 described above, laser beams 156 and 158 are established to counter propagate within the ring laser gyroscope around a closed loop path by reflecting from mirrors 160, 162, and 164. Mirror 164 is partially transmissive and attached to prism 154 so that the counter propagating beams 156 and 158 are combined with reflections within prism 154 and then directed to single sensor 152 which includes detectors 166 and 168.

Figure 9:
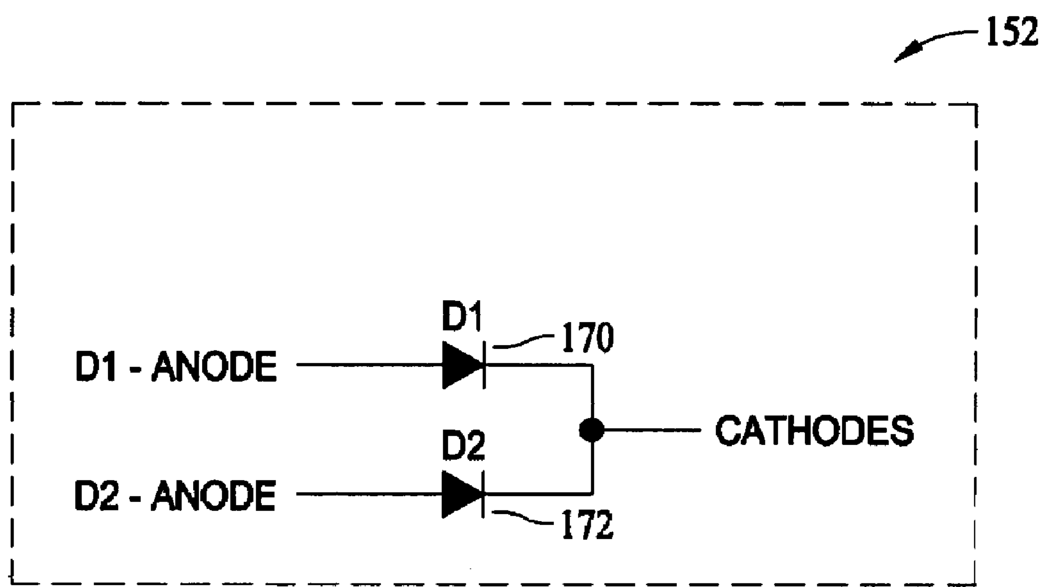
FIG. 9 is a schematic diagram of the single sensor for the ring laser gyroscope of FIG. 8.

FIG. 9 is a schematic diagram of single sensor 152 where an embodiment of readout detectors 166 and 168 are represented by dual photo sensors 170 and 172, each of which may be masked by gridlines offset by a half period. Single sensor 152, along with the below described electronic circuitry, provides the functionality of both readout sensor 64 (shown in FIG. 5), and LIM sensor 59 (shown in FIG. 3) and the respective electronic circuits associated with each of readout sensor 64 and LIM sensor 59.

Figure 10:
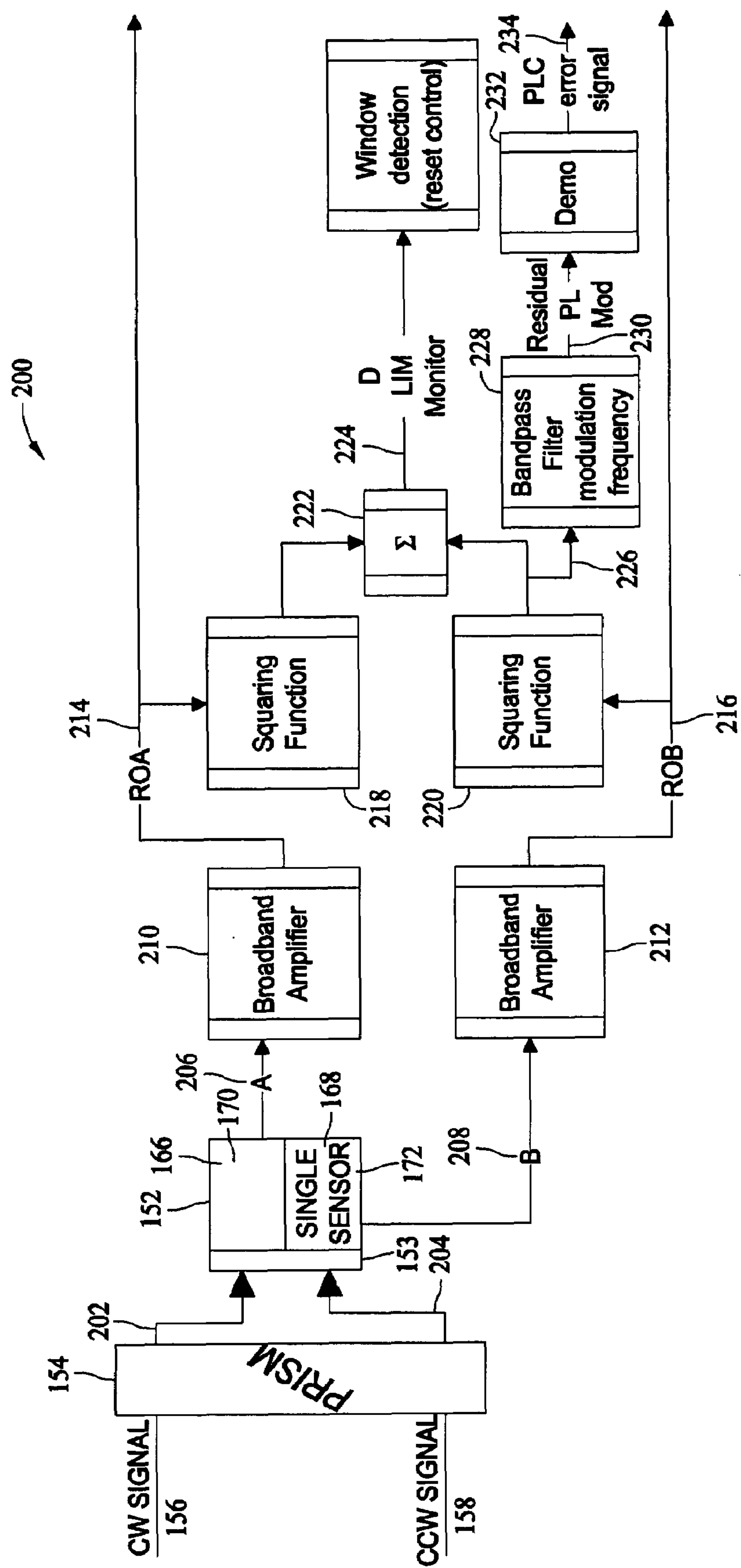
FIG. 10 is a signal processing diagram illustrating operation of a single sensor and an associated electronic circuit.

FIG. 10 is a signal processing diagram further illustrating operation of a ring laser gyroscope that incorporates single sensor 152 and an electronic circuit 200 receiving signals from single sensor 152. The counter propagating beams 156 and 158 pass through prism 154, resulting in interfering signals 202 and 204 which propagate through sensor window 153 and onto single sensor 152, which include detectors 166 and 168, in a fringe pattern Readout detectors 166 and 168, in one embodiment, are square law devices, which means that the output (interfering signals 206 and 208) are squares of the sum of the electric fields of the counter propagating beams 156 and 158. This squaring action results in sinusoidal electrical signals out of readout detectors 166 and 168 whose frequency is the difference of the two incident optical beams (the counter propagating beams 156 and 158). The difference frequency is proportional to an input angular rate to the ring laser gyroscope.

In one embodiment, single sensor 152 includes photo diodes 170 and 172 (both shown in FIG. 9), with gridlines, which are offset by a half period. Single sensor 152 outputs a signal 206 from photo diode 170 and a signal 208 from photo diode 172. Signals 206 and 208 are, in one embodiment, sinusoids that are ninety degrees out of phase from one another, and are input into broadband amplifiers 210 and 212 respectively. The outputs 214 and 216 of broadband amplifiers 210 and 212 are similar to signals 206 and 208 with an increase in amplitude. The signals (outputs 214 and 216) represent an angle or orientation of the flight platform, and a frequency of the signals is representative of a speed of rotation (e.g., a rotation rate) of the flight platform in which the ring laser gyroscope is mounted.

To generate gyroscope control signals (e.g., signals similar to those which originate from LIM sensor 59 in the dual sensor ring laser gyroscope), outputs 214 and 216, sometimes referred to as signals "ROA" (readout A) and "ROB" (readout B) respectively, are AC coupled to one another. ROA and ROB are then squared utilizing squaring functions 218 and 220 which, in one embodiment, are configured to multiply the sinusoidal input by itself respectively producing an arithmetic square of the ROA and ROB signals. The resulting squared signals are then summed utilizing summing function 222 to create a DC LIM monitor signal 224.

Creation of DC LIM monitor signal 224 in a single sensor ring laser gyroscope, in one embodiment, is described in equation form as $ROA=C\times[1+m\times\cos(2\pi ft)]\times\sin(\omega t)$, where $ROA^2=C^2\times[1+m\times\cos(2\pi ft)]^2\times\sin^2(\omega t)$, and $ROB=C\times[1+m\times\cos(2\pi ft)]\times\cos(\omega t)$, where $ROB^2=C^2\times[1+m\times\cos(2\pi ft)]^2\times\cos^2(\omega t)$, where m is an amplitude of the modulated LIM signal and f is the modulation frequency. Summing, $ROA^2+ROB^2=C^2\times[1+m\times\cos(2\pi ft)]^2\ [\sin^2(\omega t)+\cos^2(\omega t)]$, which equals $=C^2\times[1+m\times\cos(2\pi ft)]^2$. As the amplitude of the modulated LIM signal "m" is much less than one, $ROA^2+ROB^2=C^2\times[1+2m\times\cos(2\pi ft)]$ which is the DC LIM monitor signal 224.

The arithmetically squared signal 226 is passed through a band pass filter 228 to obtain a residual PLC modulation signal 230. In the embodiment of FIG. 10, PLC modulation signal 230 is applied to a demodulator 232 which outputs a PLC error signal 234, which is utilized to control an optical path length within the ring laser gyroscope. In another embodiment, one of the signals, ROA and ROB, can be band pass filtered before it is squared to obtain a residual PLC modulation signal which is then demodulated to provide the PLC error signal. The result is that the ROA and ROB signals have an amplitude that is small enough such that they do not act as noise sources. The above described signal generation occurs without a reduction in signal power due to the use of a higher transmission mirror 164.

Figure 11:
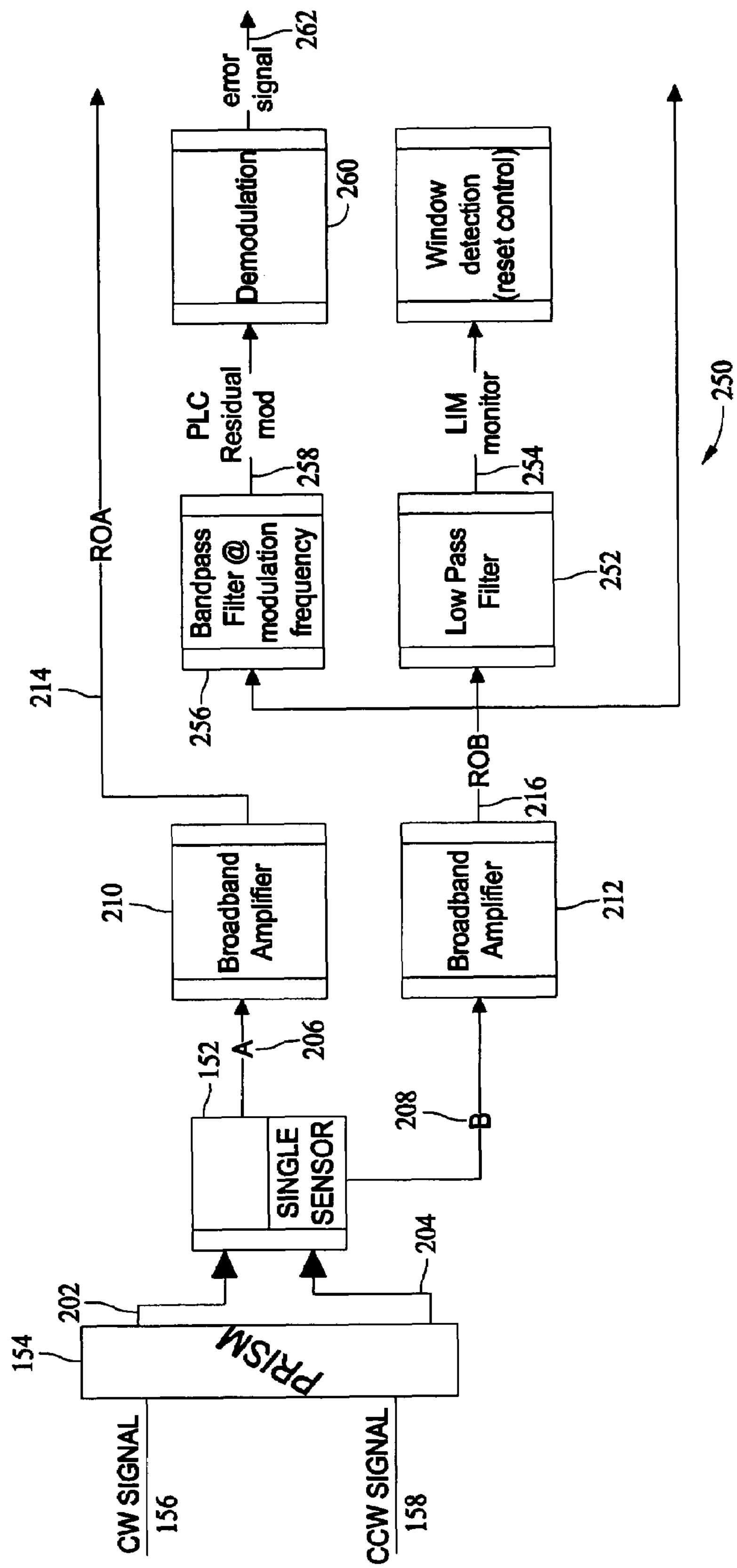
FIG. 11 is a signal processing diagram illustrating generation of both readout and LIM signals utilizing a single sensor.

Another embodiment of a signal processing diagram 250, for generating both readout and LIM signals utilizing a single sensor 152, is illustrated in FIG. 11. As shown in diagram 250, signals ROA and ROB (signals 214 and 216 respectively), are generated in the same manner as described above with respect to FIG. 10. In the embodiment of FIG. 11, only signal 216 is filtered. More specifically, signal 216 is input to a low pass filter 252 to obtain a DC LIM monitor signal 254. Signal 216 is also input to a band pass filter 256 to generate a PLC residual modulation signal 258. PLC residual modulation signal 258 is then input to a demodulator 260 to provide PLC error signal 262. In another embodiment (not shown), signal 214 is utilized to generate DC LIM monitor signal 254 and PLC residual modulation signal 258. The above described signal generation occurs without a reduction in signal power due to the use of a higher transmission mirror 164.

Figure 12:
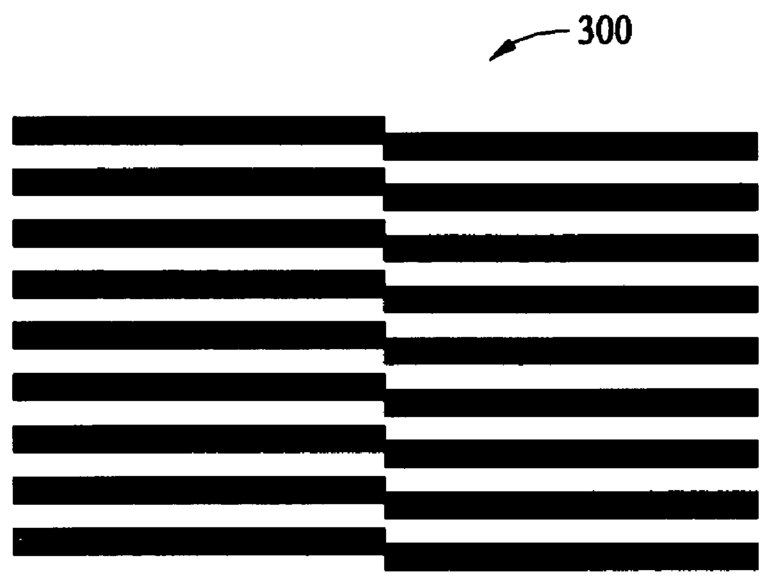
FIG. 12 illustrates a gridline pattern for utilization in a single sensor ring laser gyroscope.
Figure 13:
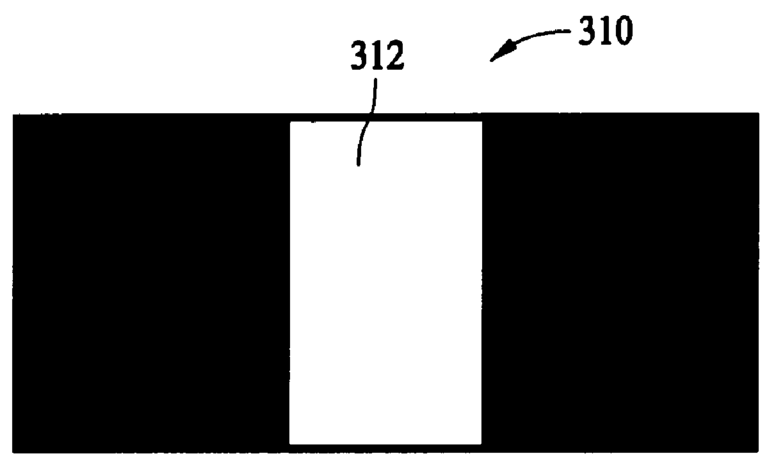
FIG. 13 illustrates a sensor window mask for a $TEM_{00}$ mode aperture.
Figure 14:
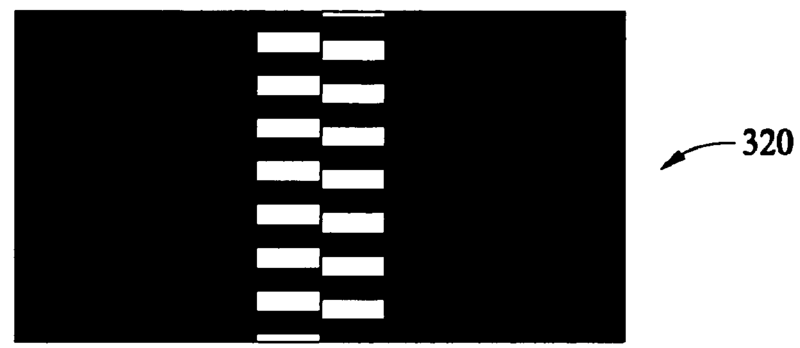
FIG. 14 illustrates an integrated outline of a $TEM_{00}$ mode aperture for utilization with the photodiodes of a single sensor.

The signal generation techniques for a single sensor ring laser gyroscope described with respect to FIGS. 10 and 11 utilize single sensor aperturing, where the apertures can reside on either sensor diodes (e.g. photodiode 170 and 172) or on sensor window 153. FIGS. 12-16 illustrates both gridline patterns and $TEM_{00}$ and $TEM_{10}$ mode apertures for a single sensor ring laser gyroscope. FIG. 12 illustrates a gridline pattern 300 for utilization in a single sensor ring laser gyroscope. Gridline pattern 300, in one embodiment, is masked onto photo detectors 166 and 168. Now referring to FIG. 13, a sensor window mask 310 that may be masked, for example, onto sensor window 153 (shown in FIG. 10). Specifically, rectangle 312 represents an outline of a $TEM_{00}$ mode aperture located on a single sensor window. FIG. 14 illustrates an integration outline 320 of gridline pattern 300 (shown in FIG. 12) and sensor window mask 310 (shown in FIG. 13). Integration outline 320 is representative of a $TEM_{00}$ mode aperture.

Figure 15:
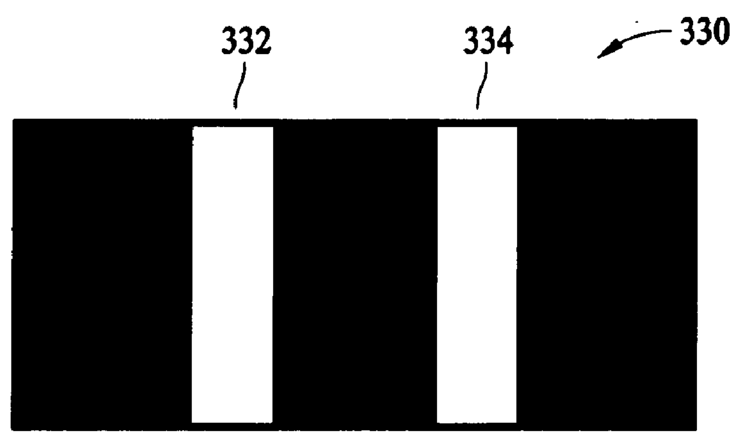
FIG. 15 illustrates an outline of a $TEM_{10}$ mode aperture for a single sensor window.
Figure 16:
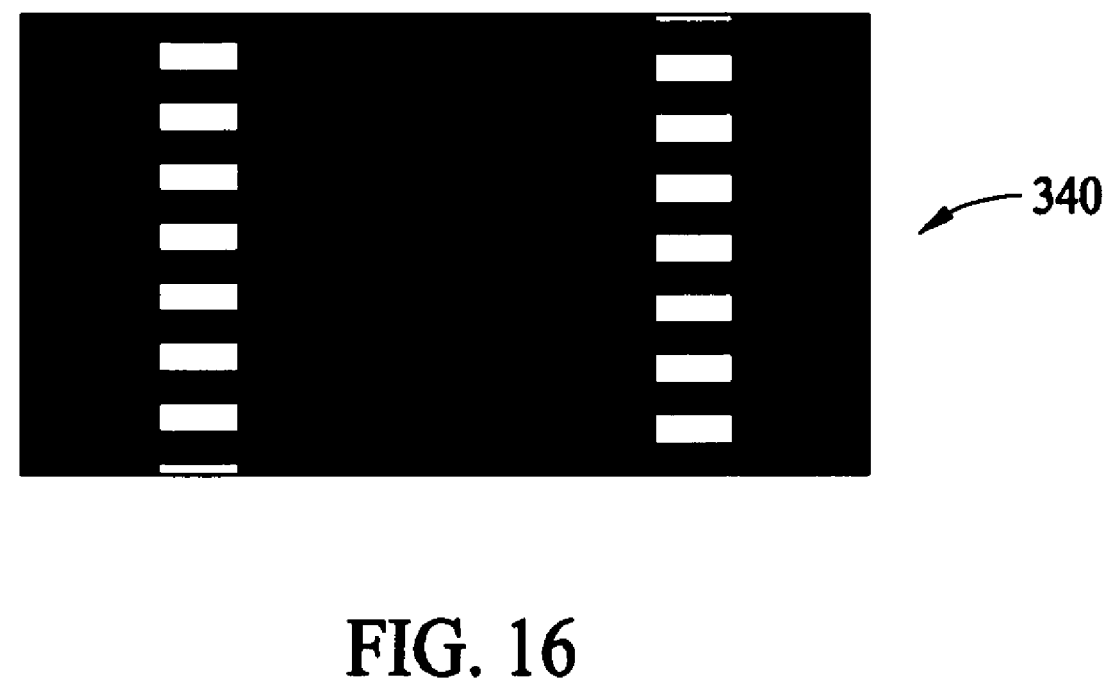

FIG. 15 illustrates a sensor window mask 330 that may be masked, for example, onto sensor window 153 (shown in FIG. 10). Specifically, rectangles 332 and 334 represent outlines for a $TEM_{10}$ mode aperture located on a single sensor window. FIG. 16 illustrates an integration outline 340 of gridline pattern 300 (shown in FIG. 12) and sensor window mask 330 (shown in FIG. 15). Integration outline 340 is representative of a $TEM_{10}$ mode aperture.

In known ring laser gyroscopes, LIM sensor 59 and readout sensor 64 operate in the 0,0 laser mode (e.g., $TEM_{00}$). Testing of ring laser gyroscopes incorporating single sensor 152 has revealed that it is more advantageous to operate in the 1,0 laser mode (e.g., $TEM_{10}$). The reason is that the 1,0 laser mode has less off-axis mode competition as compared to the 0,0 laser mode. In addition, a gridline pattern must be allowed to shift vertically within an aperture for single sensor 152 due to temperature. Therefore, an aperture for the $TEM_{00}$ mode of operation which allows vertical movement would need to effectively block out the $TEM_{01}$ mode of operation, as well as the other competing laser modes of operation, resulting in reduced power.

While the invention has been described in terms of various specific embodiments, those skilled in the art will recognize that the invention can be practiced with modification within the spirit and scope of the claims.

What is claimed is:

1. A ring laser gyroscope comprising:

a laser cavity configured to provide an optical laser path for a pair of counter-propagating laser beams;

a single optical sensor configured to receive a portion of the energy from both of the counter-propagating laser beams in a fringe pattern, said optical sensor comprising dual photo diodes configured to output signals that are out of phase from one another by about one-half period; and a unit configured to receive output signals from said optical sensor, said unit configured to utilize the output signals to generate at least a residual path length control signal, a laser intensity monitor signal, and readout signals, said unit configured to utilize at least one of the readout signals to generate the residual path length control signal and the laser intensity monitor signal.

2. A ring laser gyroscope according to claim 1 wherein said dual photo diodes are each masked with a gridline offset of one half period.

3. A ring laser gyroscope according to claim 1 further comprising a transmissive mirror for providing the counter-propagating laser beams and a prism, a portion of the energy from the counter-propagating laser beams passing through said mirror and said prism and onto said optical sensor.

4. A ring laser gyroscope according to claim 3 wherein said optical sensor comprises a sensor window, said sensor window comprising an aperture therein.

5. A ring laser gyroscope according to claim 1 further comprising an aperture located on said optical sensor.

6. A ring laser gyroscope according to claim 1 wherein to generate the laser intensity monitor signal, said unit is configured to square and sum the readout signals.

7. A ring laser gyroscope according to claim 1 wherein to generate the residual path length control signal, said unit is configured to:

square one of the readout signals; and band pass filter the squared signal, where the filter output is configured to be the residual path length control signal.

8. A ring laser gyroscope according to claim 1 wherein to generate the residual path length control signal, said unit is configured to band pass filter and square one of the readout signals, the resulting squared and filtered signal configured to be the residual path length control signal.

9. A ring laser gyroscope according to claim 1 wherein to generate the residual path length control signal, said unit is configured to band pass filter one of the readout signals.

10. A ring laser gyroscope according to claim 1 wherein to generate the laser intensity monitor signal, said unit is configured to low pass filter one of the readout signals.

11. A method for fabricating a ring laser gyroscope which incorporates a single optical sensor, said method comprising:

configuring the optical sensor to receive an optical fringe pattern and output two signals about ninety degrees out of phase from one another, where the signals are representative of an angle and the frequency of the signals is representative of a rate of turn sensed by the ring laser gyroscope;

providing an amplification circuit to amplify the two signals;

providing a squaring function configured to square each of the amplified signals;

providing a bandpass filter configured to receive one of the squared signals, an output of the bandpass filter representative of a residual path length control modulation signal; and providing a summing circuit configured to add together the squared signals, an output of the summing circuit representative of a laser intensity monitor signal.

12. A method according to claim 11 further comprising providing a demodulator configured to receive the residual path length control modulation signal from the bandpass filter, an output of the demodulator representative of a path length control error signal.

13. A method according to claim 11 wherein configuring the optical sensor comprises masking dual photo diodes with a gridline offset of one half period.

14. A method for fabricating a ring laser gyroscope which incorporates a single optical sensor, said method comprising:

configuring the optical sensor to receive an optical fringe pattern and output two signals about ninety degrees out of phase from one another, where the signals are representative of an angle and the frequency of the signals is representative of a rate of turn sensed by the ring laser gyroscope;

providing an amplification circuit to amplify the two signals;

providing a bandpass filter configured to receive one of the amplified signals, an output of the bandpass filter representative of a residual path length control modulation signal; and providing a low pass filter configured to filter one of the amplified signals, an output of the low pass filter representative of a laser intensity monitor signal.

15. A method according to claim 14 further comprising providing a demodulator configured to receive the residual path length control modulation signal from the bandpass filter, an output of the demodulator representative of a path length control error signal.

16. A ring laser gyroscope comprising:

an optical sensor configured to receive a portion of the energy from a pair of counter-propagating laser beams in a fringe pattern, said optical sensor comprising dual photo diodes configured to output signals that are out of phase from one another by about one-half period;

an amplification circuit configured to amplify and output the signals, where the signals are representative of an orientation and the frequency of the signals is representative of a rate of turn sensed by said ring laser gyroscope;

a squaring circuit configured to square the outputs of said amplification circuit;

a bandpass filter configured to receive one of the outputs of said squaring circuit, an output of said bandpass filter configured to be representative of a residual path length control modulation signal; and a summing circuit configured to add together outputs of said squaring circuit, an output of said summing circuit configured to be representative of a laser intensity monitor signal.

17. A ring laser gyroscope according to claim 16 further comprising a demodulator configured to receive the residual path length control modulation signal from said bandpass filter, an output of said demodulator configured to be representative of a path length control error signal.

18. A ring laser gyroscope comprising:

an optical sensor configured to receive a portion of the energy from a pair of counter-propagating laser beams in a fringe pattern, said optical sensor comprising dual photo diodes configured to output signals that are out of phase from one another by about one-half period;

an amplification circuit configured to amplify and output the signals, where the signals are representative of an orientation and the frequency of the signals is representative of a rate of turn sensed by said ring laser gyroscope;

a bandpass filter configured to receive one of the amplified signals, an output of said bandpass filter representative of a residual path length control modulation signal; and a low pass filter configured to receive one of the amplified signals, an output of said low pass filter configured to be representative of a laser intensity monitor signal.

19. A ring laser gyroscope according to claim 18 further comprising a demodulator configured to receive a residual path length control modulation signal from said bandpass filter, an output of the demodulator configured to be representative of a path length control error signal.

* * * * *